United States Patent [19]

Eggleston

[11] 4,005,848
[45] Feb. 11, 1975

[54] BIDIRECTIONAL PRESSURE-ASSISTED VALVE SEAL

[75] Inventor: Philip W. Eggleston, Marshalltown, Iowa

[73] Assignee: Fisher Controls Company, Inc., Marshalltown, Iowa

[22] Filed: Feb. 11, 1975

[21] Appl. No.: 548,935

[52] U.S. Cl. .............................. 251/173; 251/307; 251/317
[51] Int. Cl.² ........................................ F16K 25/00
[58] Field of Search .......... 251/172, 173, 174, 306, 251/307, 315, 317, 368

[56] References Cited
UNITED STATES PATENTS

| 2,988,320 | 6/1961 | Kent | 251/174 |
| 3,181,834 | 5/1965 | Jennings | 251/172 |
| 3,250,510 | 5/1966 | Williams | 251/173 |
| 3,528,448 | 9/1970 | Urban | 251/173 X |
| 3,670,768 | 6/1972 | Griswold | 251/368 X |
| 3,734,457 | 5/1973 | Boos | 251/173 |

Primary Examiner—Harold W. Weakley
Attorney, Agent, or Firm—James C. Bolding

[57] ABSTRACT

Disclosed herein are valve seals wherein an annular seal member is retained in an annular recess in a valve body wall, the seal member being axially flexible. A resilient annular garter spring is provided between the seal member and a converging surface on a wall of the valve body recess. When a valve employing this seal arrangement is closed, differential pressure urging the seal member in a downstream direction tends to deflect the seal member around the garter spring, while the garter spring tends to coact with the converging surface of the recess to provide a radially inwardly moving fulcrum for forcing the seal member into tighter engagement with a valve closure member.

9 Claims, 7 Drawing Figures

BIDIRECTIONAL PRESSURE-ASSISTED VALVE SEAL

BACKGROUND OF THE INVENTION

1. Field of the Invention

This invention relates generally to seals for valves. More particularly, it relates to valve seal designs which permit improved sealing effectiveness under the influence of fluid pressure acting upon the valve.

2. Description of the Prior Art

Heretofore, in valves having a pivotable valve closure member which includes a segment of a sphere as a sealing surface, e.g. butterfly or ball valves, it has been common to employ valve seals of many different configurations and materials. Typical of such prior art seals are the butterfly valve seals disclosed by Priese in U.S. Pat. No. 3,563,510, which are retained in a generally annular recess in the valve body and which deflect under the influence of fluid pressure differential applied across the valve in a closed position to force the seal into a "corner" formed by a wall of the annular valve body recess and the peripheral sealing surface of the valve disk. Another approach disclosed in U.S. Pat. No. 3,734,457 to Roos, has been to provide a valve seal ring which is of lesser inside diameter of the sealing surface of the valve closure element and which is partially restrained against radial stretching by a resilient metal hoop, whereby an interference fit is achieved between the seal and the disk resulting in compression of the seal and stretching of the hoop upon closing the disk. Still another prior art approach disclosed by Helman et al. in U.S. Pat. No. 3,608,861 and by Swain Canadian Pat. No. 695,037 has been to provide a seal member retained in a valve body recess and a rigid annular projection on the downstream side of the body recess which function as a fulcrum to limit flexure under the influence of fluid pressure to improve sealing effectiveness.

While these and other related approaches to butterfly and ball valve seal design have proven effective in some applications, nevertheless certain problems have been encountered. When a fluorinated hydrocarbon polymer has been employed as the seal material in prior art valves the tendency of such a material to cold-flow has resulted in leakage across such valves when closed. Moreover, valves employing prior art seal configurations have not always proven effective in bidirectional service, i.e. in applications in which the higher fluid pressure may be applied to either side of the valve. Further, such seals have been, for the most part, useful only within a limited temperature range.

SUMMARY OF THE INVENTION

It is an object of this invention to provide an improved valve seal for valves having a valve closure member the sealing surface of which is a section of a sphere, such as butterfly valves or ball valves.

A further object is to provide a valve seal the effectiveness of which is increased by differential fluid pressures acting on the valve in either direction.

Another object is to provide a seal which will compensate for movement of the valve closure member under the influence of fluid differential pressure.

Yet another object is to provide a seal design which is effective over a wide temperature range, and in which compensation is provided for the effects of thermal expansion or contraction, cold-flow of the seal material, and wear. To achieve these objects, as well as others which will become apparent hereinafter, I provide a valve having a closure member retained within a valve body and pivotable therein between an open and a closed position. Retained within an annular recess in the valve body wall is a resilient valve seal member, which is provided with a radially inner sealing portion of slightly lesser diameter than that of the closure member, for sealingly engaging the periphery of the closure member when the closure member is pivoted to a valve-closing position, and which is further provided with a flexible web portion extending radially outwardly from the sealing portion. The sealing portion is of greater width than the flexible web portion, and is provided with an axially extending outer shoulder on which is retained, adjacent the flexible web, an annular resilient garter spring. The sidewall of the annular recess in the valve body wall on the side of the seal member having the axially extending shoulder includes a converging portion, which is slidingly contacted by the garter spring carried by the seal member.

In operation, when the valve closure member is pivoted to a closed position the periphery thereof engages the inner sealing portion of the seal member and forces the seal member to expand. In the absence of differential pressure across the valve, the garter spring acts as a moveable fulcrum about which the flexible web portion of the seal member is deflected, the garter spring sliding on the converging surface of the valve body recess sidewall as required to permit axial deflection and radial expansion of the seal member to accomodate the closure member. Under the influence of differential pressure applied from the side of the valve opposite the converging surface of the valve body recess, the valve disk is moved toward the side having the converging surface, while fluid pressure urges the seal member and the garter spring in the downstream and radially inward direction to increase the sealing force between the seal member and the closure member. Second fulcrum means are provided on the side of the valve body recess opposite the converging surface, whereby differential fluid pressure applied from the opposite side of the valve again tends to deflect the seal in a downstream and radially inward direction to improve sealing effectiveness between the seal and the closure member.

BRIEF DESCRIPTION OF THE DRAWINGS

Attention is now directed to the drawings, in which.

DESCRIPTION OF PREFERRED EMBODIMENTS

Figure 1:
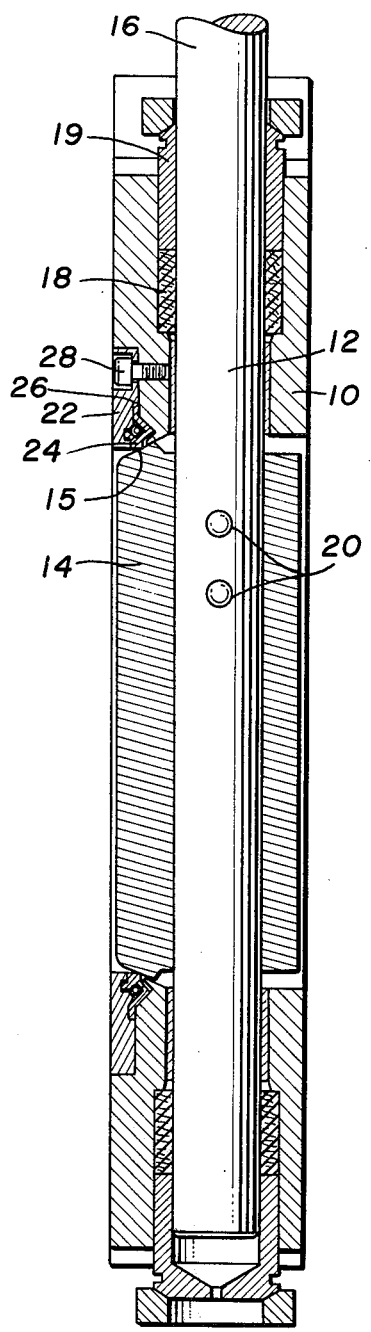
FIG. 1 is a partial cross-sectional view of a butterfly valve including a seal embodying the present invention.

In the embodiment of FIGS. 1–5, there is provided a butterfly valve having a valve body 10 within which a closure member 14 is mounted on a valve stem 12. The valve stem extends externally of the valve body at one end 16, and may be pivoted by connection at the end 16 to any conventional valve actuation means (not here shown). Suitable stem packing 18 is provided to prevent leakage of a fluid from within the valve. The closure member 14 can be secured to the valve stem 12 by any suitable means, here exemplified by pins 20. This closure member is provided with a peripheral sealing surface 15 which is preferably a section of a sphere.

Retained between an annular seal retainer 22 and the valve body 10 is an annular valve seal member, generally designated 24. Fluid-tight sealing between the seal retainer 22, an outer periphery 26 of the seal member 24, and the valve body 10 is provided by compression of the periphery 26 between the retainer and the valve body by a set of screws 28. The seal member 24 is constructed of a flexible resilient material, such as polytetrafluoroethylene, polymonochlorotrifluoroethylene, elastomers, or the like, which is chemically and physically resistant to the fluid which is to flow through the valve.

Figure 2:
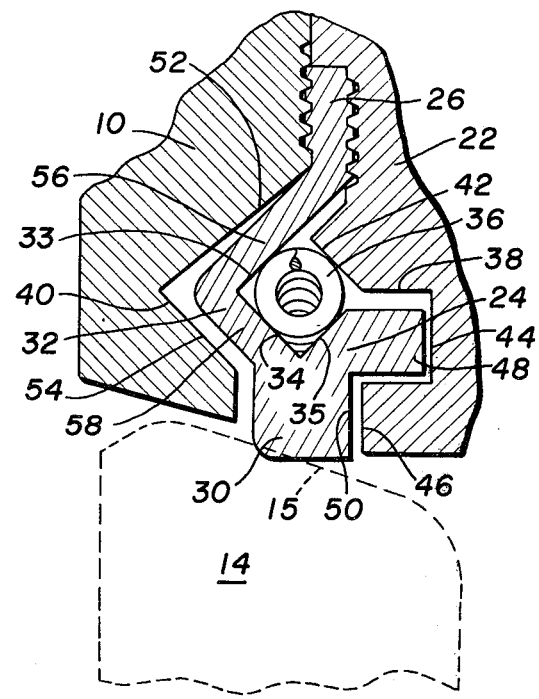
FIG. 2 is an enlarged detailed cross-sectional view of the seal of FIG. 1, showing the relative dimensions and locations of the seal elements when the valve is opened, and the valve disk when closed, respectively.

As can be more clearly seen in FIG. 2, which shows the position of the seal 24 when the valve is open, the valve seal member 24 is provided with radially inner sealing portion 30 and a flexible web portion 32 extending outwardly therefrom. The sealing portion 30 is of slightly smaller diameter than the surface 15 at the point of contact with the closure member 14, this member being shown by dashed lines to indicate its position when the valve is closed, resulting in an interference fit between these two members when the closure member is pivoted to a closed position. The sealing portion 30 is wider than the flexible web 32, and on the radially outward surface of the sealing portion 30 there is provided a generally U-shaped annular channel defined by the surfaces 33, 34, and 35 in which is retained a garter spring 36.

The facing surfaces of the valve body 10 and the seal retainer 22 define an annular valve body recess having a first sidewall 38 and a second sidewall 40. The first sidewall 38 is provided with a conical surface 42, against which the garter spring 36 abuts to deflect the inner sealing portion 30 and the flexible web 32 of the seal member 24 away from the conical surface 42 when the valve is in an open position. In this condition the inner sealing portion 30 is moved radially inward, and the web 32 is moved axially, away from the position they would occupy if the garter spring 36 were absent. The first sidewall 38 is further provided with an annular recess 44 and a radially inwardly-extending surface 46. A lip 48 on the seal member 24 is received within the annular recess 44, and a radial surface 50 extends inwardly of this lip. The radial surface 50 cooperates with the surface 46 to limit deflection of the sealing portion 30 in the direction of the first sidewall while the lip 48 and the recess 44 cooperate to form secondary or backup means for limiting axial deflection of the sealing surface 30 and further provide means for limiting the radially inward deflection thereof. The second sidewall 40 of this embodiment defines an annular groove of V-shaped cross-section, having an outer surface 52 and an inner surface 54, while the flexible web 32 of this embodiment is of a corresponding V-shaped cross-section having an outer leg 56 and an inner leg 58.

Figure 3:
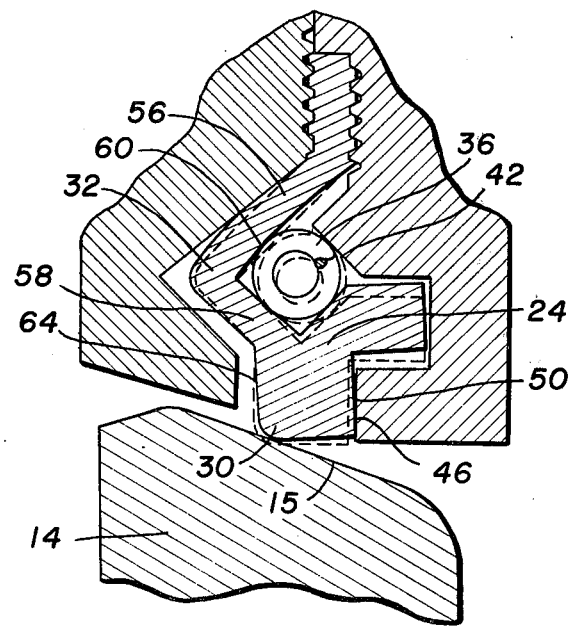
FIG. 3 is a detailed cross-sectional view of the seal of FIG. 2, shown with the disk in closed position and in the absence of differential pressure across the valve.

In FIG. 3, the valve is shown with the closure member 14 pivoted into a closed position, the sealing surface 15 thereof engaging the inner sealing portion 30 of the seal member 24. In this condition, the garter spring 36 is forced to slide radially outward along the conical surface 42 of the first sidewall as the inner portion 30 of the seal member expands to accommodate the surface 15 of the closure member as can be seen by reference to the dashed lines which indicate the position of the seal 24 and the garter spring 36 in their respective valve-open conditions. Additionally, the garter spring 36 serves as a fulcrum about which the outer leg 56 of the seal web 32 is bent at the contact point 60.

Figure 4:
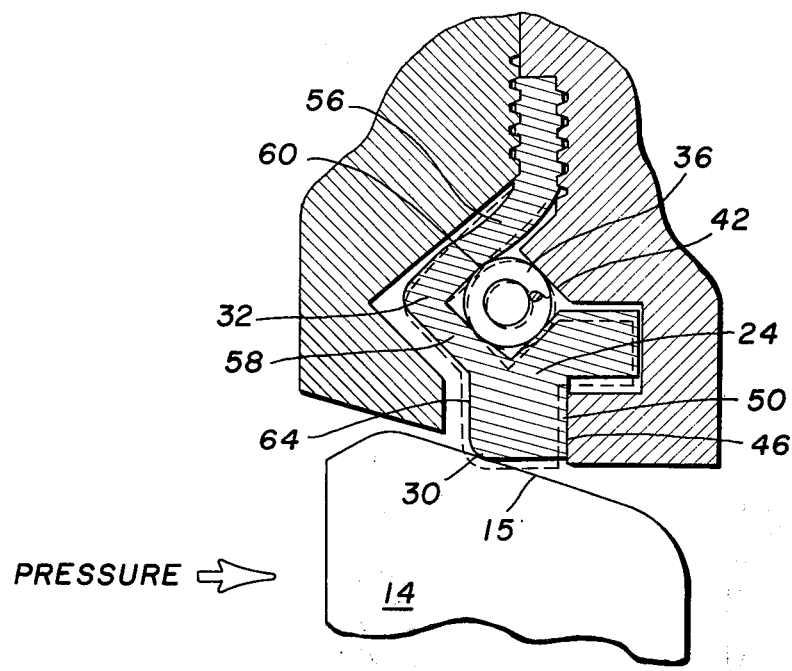
FIG. 4 is a detailed view of the seal of FIG. 2, shown with pressure applied from one side.

Under the influence of fluid pressure differential applied across the valve of FIG. 1, the higher pressure being applied from the side opposite the first body recess sidewall 38, the seal 24 and the valve closure member 14 are urged from the position of FIG. 3 to the position shown in FIG. 4, the positions of the seal member 24 and the garter spring 36 when the valve is open again being shown by dashed lines for comparison. Fluid pressure urges the closure member 14 toward the first body recess sidewall, while pressure acting on the outer leg 56, the inner leg 58, and the radial surface 64 of the seal 24 force the garter spring 36 to slide in a generally downstream direction and to move radially inwardly from its position shown in FIG. 3, along the conical surface 42 until the radial surface 46 of the valve body recess and the surface 50 of the seal member abut to stop further downstream movement of the seal member. The influence of fluid pressure acting on the upstream side of the seal member is translated by means of the sliding action of the garter spring 36 on the conical surface 42 into a force having a radially inward component, whereby increased pressure differential increases the sealing force between the seal member sealing portion 30 and the sealing surface 15 of the valve disk.

Figure 5:
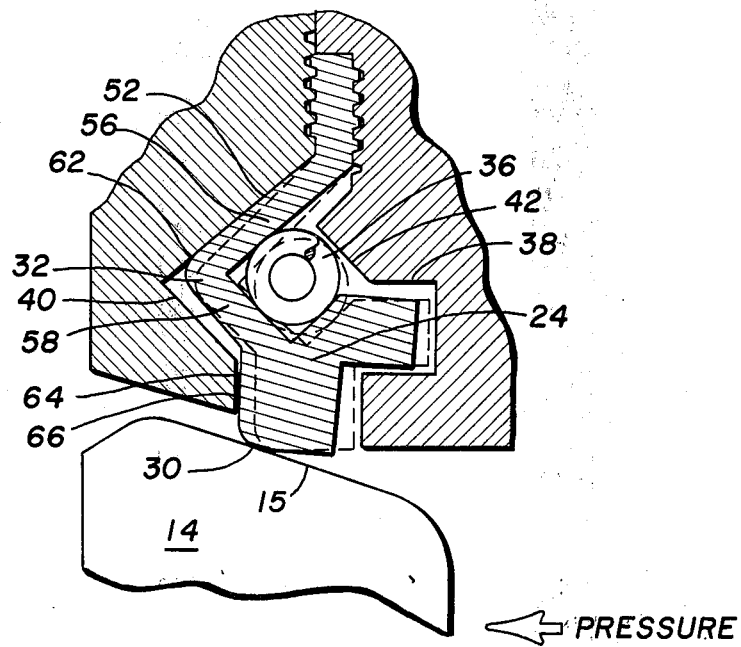
FIG. 5 is a view of the seal of FIG. 2, shown with fluid pressure applied from the opposite side.

In FIG. 5 the seal 24 and closure member 14 of this embodiment are shown under the influence of differential pressure acting toward the second sidewall 40 of the valve body recess, and again dashed lines indicate the positions occupied by the seal 24 and the garter spring 36 when the valve is open. In this condition, the garter spring 36 moves away from the conical surface 42, and the flexible web 32 is moved in a downstream direction toward the sidewall 40 until its outer leg 56 abuts the outer surface 52 of the groove in the second sidewall, at which time the point 62 becomes a fulcrum, or pivot point, for deflection of the inner leg 58 of the seal web. Fluid pressure acting on the upstream side of the seal member 24 is translated through the inner leg 58 of the web into a force having a radially inward component, again increasing the sealing force between the inner sealing portion 30 of the seal and the sealing surface 15 of the valve closure member. Excessive deflection of the seal 24 toward the second sidewall 40 is prevented by abuttment of the radial surface 64 on the downstream side of the sealing portion 30 against a corresponding radial surface 66 of the second sidewall 40 of the valve body recess.

THE EMBODIMENT OF FIG. 6

Figure 6:
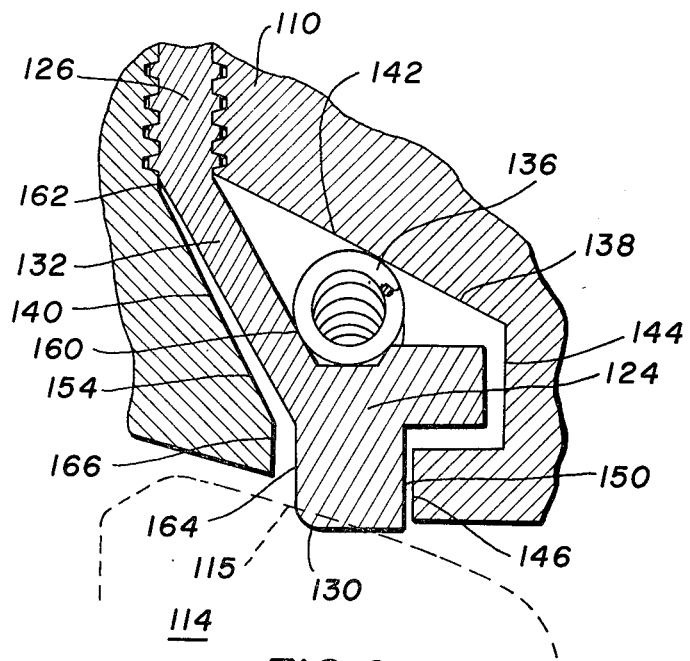
FIG. 6 is a detailed cross-sectional view of another embodiment of the present invention.

An alternative embodiment of this invention is shown in FIG. 6, wherein a seal member 124, shown in its valve-open position, is retained in a valve body recess defined by a first sidewall 138 and a second sidewall 140. The first sidewall includes a converging surface 142, an annular recess 144, and an inwardly extending radial surface 146, while the second sidewall 140 includes an inclined surface 154 and a radial surface 166. The seal member 124 includes an inner sealing portion 130 and a flexible web portion 132, the outer periphery 126 of which is sealingly retained by the valve body 110. Carried on the seal member 124 radially outwardly of the sealing portion 130 thereof is a garter spring 136, which is held in abutting relationship with the converging surface 142 of the first body recess sidewall by resilient action of the seal web 132 when the valve is in an open condition. As in the embodiment of FIGS. 1–5, the sealing portion 130 of the seal member is of smaller diameter than that of a sealing surface 115 on a pivotable valve closure member 114, which is here shown by dashed lines in the position it would occupy upon closing the valve.

In operation, the seal member of FIG. 6 operates similarly to the embodiment of FIGS. 1–5. When the closure member 114 is pivoted to a closed position, the sealing surface 115 thereof engages the sealing portion 130 of the seal member and forces the sealing portion to expand radially while the garter spring 136 slides outwardly along the converging surface 142 of the body recess sidewall 138. The garter spring 136 serves as a fulcrum about which the flexible web 132 of the seal member deflects at the contact point 160. Under the influence of fluid pressure differential applied to the side of the valve opposite the converging surface 142, pressure acting on the web 132 and the radial surface 164 of the seal member urges the seal member toward the sidewall 138 of the body recess and causes the garter spring 136 to slide along the converging surface 142 until the radial surface 150 of the seal abuts the inwardly extending surface 146 of the recess sidewall 138. Coaction of the garter spring and the converging surface forces the sealing portion 130 of the seal member radially inward to engage more tightly the sealing surface 115 of the closure member. Under the influence of fluid pressure differential applied across the valve from the side opposite the body recess sidewall 140, the flexible web 132 of the seal member deflects about a fulcrum point 162 until the web and radial surface 164 of the seal member abut the sidewall surfaces 154 and 166 respectively. In so deflecting, the flexible web 132 and the differential fluid pressure urge the sealing portion 130 of the seal member radially inward to engage more tightly the sealing surface 115 of the valve closure member 114.

THE EMBODIMENT OF FIG. 7

Figure 7:
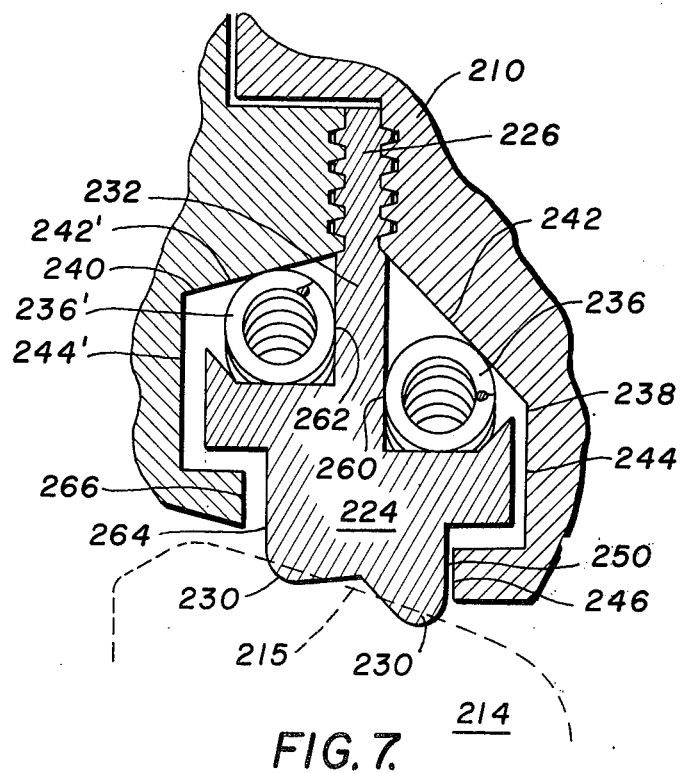
FIG. 7 is a detailed cross-sectional view of an embodiment of the present invention having two garter springs.

In the embodiment of this invention shown in FIG. 7 a valve seal member 224 is shown retained in a valve body recess, defined by sidewalls 238 and 240, in the body 210 of a valve. The seal member 224 includes an inner sealing portion 230 and an outwardly extending flexible web 232, the outer periphery 226 of which is retained in sealing engagement with the valve body 210. Radially outwardly of the sealing portion 230, and adjacent to opposite sides of the flexible web 232, there are retained a pair of annular garter springs 236 and 236'.

The body recess sidewall 238 includes a converging surface 242 and radially extending surfaces 244 and 246, while the opposing recess sidewall 240 includes a converging surface 242' and radially extending surfaces 244' and 266. When the valve is open, the seal member 224 occupies the position shown in FIG. 7, the garter springs 236 and 236' abutting the converging surfaces 242 and 242', respectively.

In this embodiment, the valve is provided with a closure member 214 having a sealing surface 215 for engaging the sealing portion 230 of the seal member 224. The closure member 214 is pivotable between an open and a closed position, and is here shown by dashed lines in its closed position to illustrate that, as in the above-described embodiments, the sealing portion 230 of the seal member and the sealing surface 215 of the closure member are dimensioned so as to provide an interference fit therebetween upon closure of the valve.

When a valve equipped with a seal according to this embodiment is closed and fluid pressure differential is applied from the side opposite the body recess sidewall 238, the seal member 224 is urged toward the sidewall 238 by the fluid pressure. The garter spring 236 slides from its valve-closed position in the absence of fluid pressure differential in a downstream and radially inward direction along the converging surface 242 until the radial surfaces 250 of the valve member and 246 of the body recess sidewall abut. In sliding along the converging surface 242, the garter spring 236 forces the sealing portion 230 of the seal member into tighter engagement with the sealing surface 215 of the closure member, and additionally provides a fulcrum about which the flexible web 232 of the seal member deflects at the point 260. When fluid pressure differential is applied across the valve from the side opposite the body recess sidewall 240, the garter spring 236' slides from its valve-closed position in the absence of fluid pressure differential in a downstream and radially inward direction along the converging surface 242', and provides a fulcrum for deflection of the flexible web 232 of the seal member at the point 262, again forcing the sealing portion 230 of the seal member into tighter engagement with the sealing surface 215 of the closure member 214.

Obviously, many modifications and variations to the valve seal arrangement described herein will occur to those skilled in the art in the light of the above teachings. For example, although I have illustrated and described preferred embodiments wherein this seal is employed in a butterfly valve, clearly such a seal may be employed in ball valves equally well. Further, although garter springs have been shown in the preferred embodiments, other resiliently expansible annular means may be substituted. It is therefore to be understood that this invention may be practiced otherwise than as herein specifically described.

What is claimed is:

1. A valve structure, comprising
   a valve body having a central bore therethrough;
   a valve closure member mounted in said bore and movable between an open and closed position about an axis substantially transverse to said bore, and having a peripheral sealing surface;
   said valve body including an annular recess circumscribing said bore and disposed in radial alignment with said sealing surface when said closure member is closed and having a first sidewall and a second sidewall, said first sidewall including a converging tapered surface;
   a seal member including a peripheral portion in sealing engagement with said valve body, an inner annular sealing portion disposed to engage said sealing surface of said closure member when closed, and an intermediate flexible portion joining said peripheral portion and said inner sealing portion, the junction of said flexible portion and said inner sealing portion defining a channel having first and second side walls; resilient annular means disposed against said walls of said channel and between said annular sealing portion of said seal member and said converging surface of said first body recess sidewall for sliding on said converging surface to provide a moveable fulcrum about which said flexible portion bends for limiting movement of said sealing portion toward said first body recess sidewall and for deflecting and urging said sealing portion radially inward; and second fulcrum means on said second body recess sidewall;

said annular sealing portion and said intermediate flexible portion of said seal member being substantially completely exposed to fluid pressure acting from either direction in said bore;

whereby by coaction of one of said fulcrum means and said fluid pressure, sealing engagement between said seal member and said peripheral sealing surface of said closure member is improved when said fluid pressure acts on said seal member from either direction and said closure member is in a closed position.

2. A valve seal according to claim 1, wherein said shoulder portion of said seal member further defines a third channel sidewall for receiving said resilient annular means.

3. A valve seal according to claim 1 wherein said resilient annular means is a garter spring.

4. A valve seal according to claim 1, wherein said closure means includes a sealing surface which is a section of a sphere.

5. A valve seal according to claim 1 wherein said seal member sealing surface and said closure means are sized to provide an interference fit.

6. A seal according to claim 1, wherein said seal member is formed of polytetrafluoroethylene.

7. A seal according to claim 1 wherein said converging surface is a section of cone.

8. A seal according to claim 1, wherein said seal member is formed of polymonochlorotrifluoroethylene.

9. A seal according to claim 1 wherein said seal member is formed of an elastomer.

* * * * *

UNITED STATES PATENT OFFICE
CERTIFICATE OF CORRECTION

PATENT NO. : 4,005,848
DATED : February 1, 1977
INVENTOR(S) : Philip W. Eggleston It is certified that error appears in the above-identified patent and that said Letters Patent are hereby corrected as shown below:

On the Title page, delete the date of issue [February 11, 1975] and insert the correct date of issue -- February 1, 1977 --.

Signed and Sealed this

Second Day of May 1978

[SEAL]

Attest:

RUTH C. MASON
Attesting Officer

LUTRELLE F. PARKER
Acting Commissioner of Patents and Trademarks